(12) United States Patent
Bismuth et al.

(10) Patent No.: US 8,588,500 B2
(45) Date of Patent: Nov. 19, 2013

(54) PROCESS FOR THREE-DIMENSIONAL RECONSTRUCTION OF AN OBJECT FROM A SINGLE VIEW

(75) Inventors: Vincent Bismuth, Paris (FR); Sebastian Gorges, Versailles (FR)

(73) Assignee: General Electric Company, Schenectady, NY (US)

( * ) Notice: Subject to any disclaimer, the term of this patent is extended or adjusted under 35 U.S.C. 154(b) by 435 days.

(21) Appl. No.: 12/873,797

(22) Filed: Sep. 1, 2010

(65) Prior Publication Data

US 2011/0135183 A1  Jun. 9, 2011

(30) Foreign Application Priority Data

Sep. 2, 2009 (FR) ...................................... 09 55984

(51) Int. Cl.
*G06K 9/00* (2006.01)
(52) U.S. Cl.
USPC ......................................................... 382/132
(58) Field of Classification Search
None
See application file for complete search history.

(56) References Cited

U.S. PATENT DOCUMENTS

2003/0220555 A1   11/2003   Heigl et al.

FOREIGN PATENT DOCUMENTS

WO         2004/055734 A1     7/2004

OTHER PUBLICATIONS

UK Search Report from corresponding application No. GB1014014.3 on Dec. 9, 2010.
Baert, S.A.M.; Van De Kraats, E.B.; Van Walsum, T.; Viergever, M.A.; Niessen, W.J., "Three-dimensional guide-wire reconstruction from biplane image sequences for integrated display in 3-D vasculature", IEEE Transactions on Medical Imaging, vol. 22, Issue 10, Oct. 2003 pp. 1252-1258.
Horn, B.K.P., "Obtaining shape from shading information" The psychology of computer vision, McGraw-Hill, New York,1975.
Bruckstein, A.M.,"On Shape from Shading", Computer Vision, Graphics, and Image Processing 44, 139-154 (1988), Faculty of Electrical Engineering, Technion, IIT, 32000, Haifa, Israel, revised May 6, 1988.
Unofficial translation of Search Report and Written Opinion from FR Application No. 0955984 dated Jul. 9, 2010.
Esthappan, J. et al: "3D Orientations of Catheters from Single Projections", Computer-Aided Diagnosis in Medical Imaging, Elsevier, Amsterdam, NL, Sep. 20, 1998, pp. 357-361.
Baert, S. A. M., et al: "Guide Wire Reconstruction and Visualization in 3DRA using Monplane Fluoroscopic Imaging", IEEE Transactions on Medical Imaging, Piscataway, NJ, US, vol. 24, No. 5, May 1, 2005, pp. 612-623.
Merle, A. B. et al., "3D-reconstruction of the deformable coronary tree skeleton from two X-ray angiographic views" in "Computers in Cardiology", of Sep. 13-16, 1998, pp. 757-760.

*Primary Examiner* — Claire X Wang
(74) *Attorney, Agent, or Firm* — Global Patent Operation; Marc A. Vivenzio

(57) ABSTRACT

A method for determining an orientation in space of a substantially cylindrical shaped elementary object using a radiography device comprising a source of X-rays and a detector disposed opposite the source is provided. The radiography device is arranged to record a projection image of the elementary object when the elementary object is located between the source and the detector. The method includes: determining a quantity A of X-rays absorbed by the elementary object on the projection image; and evaluating the sine of an angle θ as a function of the quantity A of absorbed X-rays, wherein the angle θ is between a longitudinal axis of the elementary object and a plane of the projection image.

10 Claims, 4 Drawing Sheets

PROCESS FOR THREE-DIMENSIONAL RECONSTRUCTION OF AN OBJECT FROM A SINGLE VIEW

BACKGROUND OF THE INVENTION

1. Field of Invention

The field of the invention relates to evaluation of the orientation and dimension of an elementary object having a substantially cylindrical revolution shape as well as the three-dimensional reconstruction of an object formed from a series of these elementary objects or assimilable by approximation to a series of these elementary objects, all from a projection bidimensional image in a radiography device.

2. Description of the Prior Art

In some interventional X-ray procedures, the practitioner is encouraged to insert catheters and others guide-wires inside the body of the patient being treated. Catheters can serve for injecting a contrast liquid, such as iodine, and the guide-wires can be utilised for placing therapeutic instruments such as balloons, vascular endoprostheses, etc. The commonality of these catheters and guide-wires is that they are curvilinear structures with a substantially circular cross-section.

Within the scope of these interventional procedures, and particularly in neurosurgery, the vascular network of the patient being treated is very complicated and a bidimensional projection very often provides insufficient information. Because of this, it is necessary to construct three-dimensional models of this vascular network and provide an aid for localisation of instruments in these three-dimensional models. This need emerges also in interventional cardiology where the role of three-dimensional models is growing with support from the development of cardiac scanners.

In this context, it is admitted that a single bidimensional view of the interventional instrument is not sufficient to construct a three-dimensional representation thereof. Some techniques have been developed from biplanar acquisitions which simultaneously utilise two bidimensional projections at different angles. However, such projections are not sufficient for reconstructing a curvilinear structure in three dimensions without any ambiguity, such as a guide-wire or a catheter. Also, this needs a dose of radiation greater than for acquisition of a single image, which is never preferable. Such techniques are described in articles by Merle, A. B. et al., titled "3D-reconstruction of the deformable coronary tree skeleton from two X-ray angiographic views" in "Computers in Cardiology", of Sep. 13-16, 1998, pages 757-760, and by Baert. S. A. M. et al. titled "Three-dimensional guide-wire reconstruction from biplane image sequences for integrated display in 3-D vasculature", in Medical Imaging, IEEE Transactions, Volume 22, Issue 10, October 2003, pages 1252-1258. In the scope of interventional cardiology, three-dimensional reconstruction using traditional methods seeking to acquire images at different angulations is generally limited by the movement between the images induced by cardiac and respiratory movement of the patient.

SUMMARY OF THE INVENTION

An aim of an embodiment of the invention is to provide a process for evaluation of the orientation in space of an elementary object having a substantially cylindrical revolution shape which is precise, while reducing irradiation of the patient.

According to a first aspect, an embodiment of the invention concerns a process for evaluation of the orientation in space of an elementary object having a substantially cylindrical revolution shape in a radiography device comprising a source of X-rays and recording means located opposite the source and arranged so as to record a projection image of the elementary object located between the source and the recording means, the process comprising steps of:

a—determination on the projection image of a quantity A of absorbed X-rays by the elementary object; and b—evaluation of the sine of an angle θ between a longitudinal axis of the elementary object and a plane of the projection image as a function of the quantity A of absorbed X-rays.

Therefore, using X-ray absorption properties of the elementary object determines precisely the orientation in space of the object from a single bidimensional image projection of the object, which also prevents the patient from being irradiated needlessly.

Advantageously, though optionally, this process has at least one of the following additional characteristics:

in step b, $$\sin(\theta) = -2\mu \frac{r}{\ln(A)}$$

where r is a radius of a cross-section of the elementary object and μ is radiological linear absorbance of the elementary object; and, in step b, $$\sin(\theta) = \frac{K}{\ln(A)},$$

where K is an absorbance constant dependent on the elementary object.

According to a second aspect, an embodiment of the invention relates to a process for evaluation of a dimension $d_{real}$ in space of an elementary object having a substantially cylindrical shape in a radiography device comprising a source of X-rays and recording means located opposite the source and arranged so as to record a projection image of the elementary object located between the source and the recording means, the process comprising steps of:

a—evaluation of orientation in space of the elementary object by the process according to the first aspect;

b—determination on the projection image of a projected dimension $d_{obs}$; and c—determination of the dimension $d_{real}$ from the evaluated orientation and from the determined projected dimension $d_{obs}$.

In this way, such a process determines the length of a portion of the object by avoiding the projective effects inherent to X-rays used in the radiography device.

Advantageously, though optionally, this process has the following added characteristic:

in step c, the dimension $d_{real}$ is evaluated by:

$$d_{real} = d_{obs}/\sin(\theta).$$

According to a third aspect, an embodiment of the invention relates to a three-dimensional reconstruction process of an object formed from a series of elementary objects having a substantially cylindrical revolution shape in a radiography device comprising a source of X-rays and recording means located opposite the source and arranged so as to record a projection image of the object located between the source and the recording means, the three-dimensional reconstruction process comprising, for each elementary object $S_i=|P_{i-1}, P_i|$ of the object, steps of:

a—determination of orientation in space of the elementary object $S_i$ by the process according to the first aspect; and b—determination of the relative coordinates in space of $P_i$ of the ends ($P_{i-1}$, $P_i$) of the elementary object $S_i$ relative to the other of the ends ($P_{i-1}$, $P_i$) of the elementary object $S_i$.

Advantageously, though optionally, this process has one of the following added characteristics:

between step a and step b, the process comprises a step of:

$a_1$—determination of a length of the elementary object $S_i$ by the process according to the second aspect:

during step a, a value of the angle $\theta_i$ is selected from the values $\theta_i$ and $\pi-\theta_i$ in such a way that $\theta_i$ is the closest possible to $\theta_{i-1}$;

once all the elementary object $S_i=|P_{i-1}, P_i|$ of the object are treated, the process determines the total length of the reconstructed object; and the total length of the reconstructed object is the sum of the lengths of the elementary objects $S_i$ determined in step b.

According to a fourth aspect, an embodiment of the invention relates to a radiography device comprising a source of X-rays and recording means located opposite the source and arranged so as to record a projection image of an object located between the source and the recording means, and means for carrying out at least one of the preceding processes.

BRIEF DESCRIPTION OF THE DRAWINGS

Other characteristics and advantages of the invention will emerge from the following description of an embodiment of the invention with reference to the attached diagrams, in which.

DETAILED DESCRIPTION OF THE INVENTION

Figure 5:
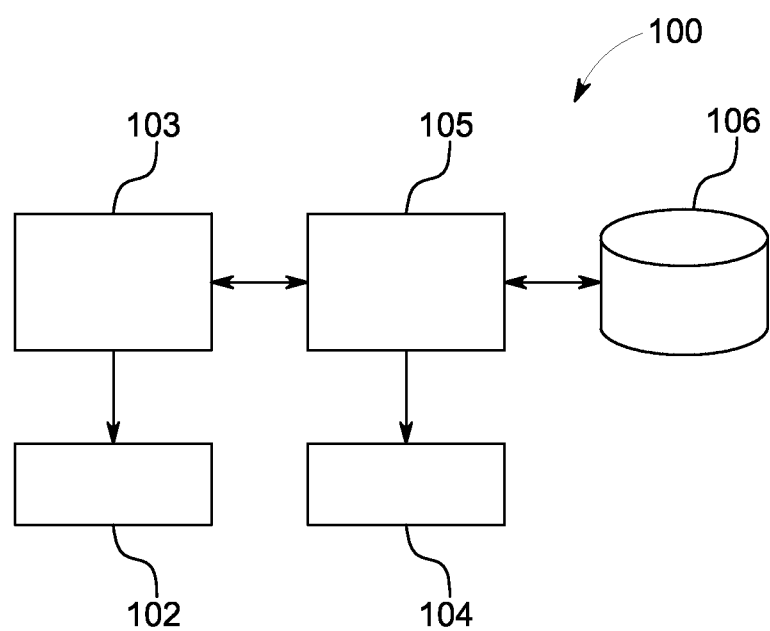

FIG. 5 schematically illustrates a radiography or medical imagery device 100 for the acquisition of bidimensional projection images for evaluation of the orientation of an elementary object having a substantially cylindrical revolution shape and for the three-dimensional reconstruction of an object formed from a series of these elementary objects.

Such a device can be a radiography device for the detection and marking of objects introduced inside a patient during surgical interventions.

The radiography device 100 comprises an image-acquisition system 103, an image-processing system 105 and a display system 104.

The acquisition system 103 acquires a plurality of bidimensional projections of a region of interest—of an organ—of a patient. The acquisition system 103 is especially constituted by a detector 20 located opposite a source of X-rays 30. The detector is for example a digital camera. The acquisition system is for example an X-ray acquisition system, the latter comprising any known means for emission of X-rays onto the object 102 and the acquisition of resulting images.

The display system 104 can be integrated in the image-acquisition system 103 or the image-processing system 105, or be separate from the acquisition system 103 and from the processing system 105. The display system 104 is for example a computer screen, a monitor, a flat screen, a plasma screen, or any type of commercially available display device. The display system 104 allows an operator to control the reconstruction and/or display of acquired bidimensional images.

The processing system 105 is adapted to executing the treatment process (for example reconstruction of a three-dimensional image from bidimensional images). The processing system 105 can be integrated into the image-acquisition system 103 or be separate from the image-acquisition system 103. The processing system 105 is for example a computer(s), a processor(s), a microcontroller(s), a micro-computer(s), a programmable automaton(s), an integrated circuit(s) for specific application, other programmable circuits, or other devices which include a computer such as a workstation. The processing system 105 is coupled to memory means 106 which can be integrated in or separated from the processing system 105. These means can be formed by a hard drive or any other removable storage means (a CD-ROM, a diskette, etc.). These memory means can serve to store a three-dimensional image of the zone of the organ viewed as a bidimensional image acquired or processed. It can be ROM/RAM memory of the processing system 105, a CD-ROM, a USB key, memory of a central server. The processing system 105 can comprise a reading device (not shown) for example a disc reader or a CD-ROM reader, for reading the instructions of the treatment process (to be described hereinbelow) of an instructional medium (not shown), such as a diskette or a CD-ROM. As a variant, the processing system 105 executes the instructions of the treatment process (to be described hereinbelow) stored in microsoftware (not shown).

In reference to FIGS. 1A, 1B, 2A and 2B, we will now describe a process for evaluation of the orientation of an elementary object $S_i$ (10) which has a substantially homogeneous cylindrical revolution shape of length $d_{real}$, axis (11) and whereof a circular cross-section has a radius r. To illustrate what we mean, this elementary object is here part of a guide-wire. It is understood that the following is applicable to a catheter as well as to any other interventional instrument which could be modelled in a series of elementary objects $S_i$ (10) of the above type. In general, the following is applicable to any object whereof the absorbance is a function of the orientation.

The process is intended to be used in a radiography device 100 comprising the source of X-rays 30 and the recording means 20 located opposite this source of X-rays. The recording means are arranged so they can take a bidimensional image projection of an object which is located between said source of X-rays and said recording means. Here, the recording means 20 are substantially plane and comprise a digital detector.

Figure 1A:
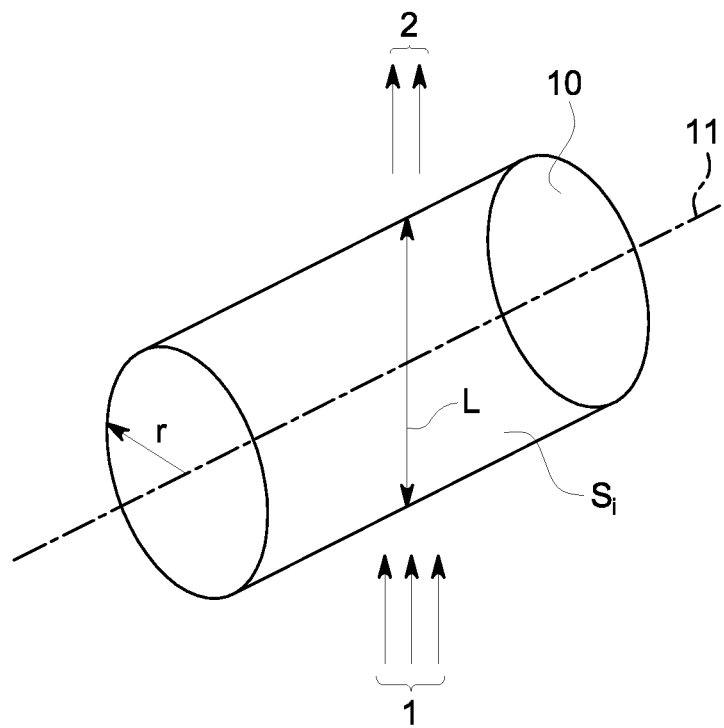
FIG. 1A is a three-dimensional schematic drawing showing the absorption of X-rays of an elementary object.
Figure 1B:
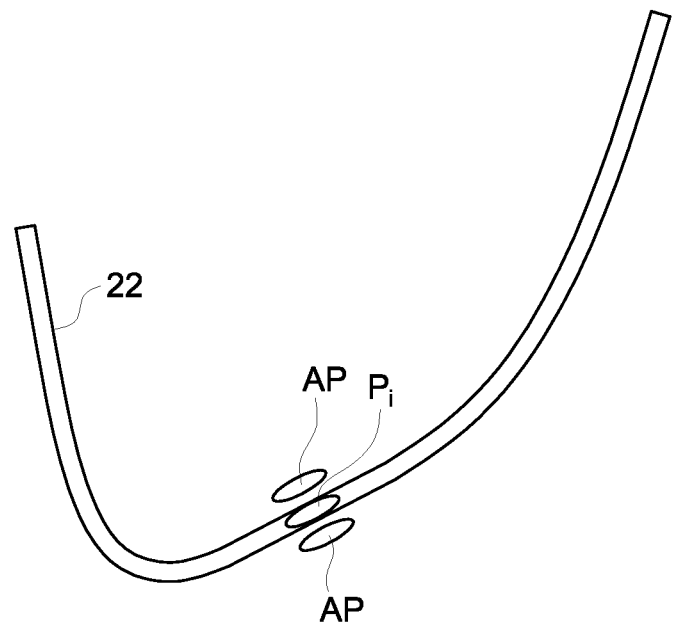
FIG. 1B is a three-dimensional schematic drawing of the calculation.

Processes which determine, on a bidimensional image projection, the axis or median line of a guide-wire are known to the person skilled in the art. For each point of projection of the guide-wire located on this axis or median line, radiological absorbance is calculable. It is understood that radiological absorbance represents the X-ray absorption of the guide-wire at the point considered. This radiological absorbance can be estimated by forming the ratio between a quantity value of photons X at the relevant point ($P_i$) of the guide-wire and a quantity value of photons X on a background (AP) near the relevant point of the guide-wire, as illustrated in FIG. 1bis.

The elementary object $S_i$ (10) of radius r has radiological linear absorbance μ. This means that if N photons X (1) pass through a thickness 1 of material forming such a cylinder of revolution, only $N \cdot e^{-\mu l}$ photons X (2) emerge. The absorbance of the cylinder of revolution is thus $$A = \frac{N.e^{-\mu.l}}{N} = e^{-\mu.l}.$$

However, for the elementary object $S_i$, the thickness 1 of material penetrated by incident X-rays (1) depends solely on the angle θ between the axis (11) of the elementary object $S_i$ and the incident X-rays (1). The relation is given by the equation: sin(θ)=2·r/l.

The absorbance A of the elementary object accordingly depends solely on the angle θ and inversely, giving:

$$\sin(\theta) = -\mu \cdot \frac{2.r}{\ln(A)}$$

Determination of the value of the angle θ requires only exactly knowing a value of the radius r of the cross-section of the elementary object $S_i$ and a value of the linear radiological absorbance p of said elementary object $S_i$, a value depending on the material forming said elementary object and on the type of X-rays emitted by the source 30 to the recording means 20. These parameters are easily determined during acquisition and from data, and from the guide-wire and the radiography device in which the process is executed.

It should be noted that, in this equation, if the equivalence "orientation-absorbance" is known at one point, it can be used for estimating the product μr, hence constant absorbance K=2μr, and for deducing therefrom the relation for any orientation for the same object. This helps calibrate the method from a simple image acquired in particular conditions such that orientation of the object is known at one point at least.

However, since the equation hereinabove gives only a value of the sinus of the angle θ, the value of the angle θ per se can be equal to θ or π-θ. This ambiguity does not indicate whether the elementary object $S_i$ (10) to be modelled "comes" towards the recording means (20) (see FIG. 2) or "moves away" from said recording means (20) (see FIG. 2bis). The limit of this method is thus reached.

Once the value of the angle θ is determined, and in particular the value of sin(θ), according to the process previously described, it is then possible to determine the length $d_{real}$ of the elementary object $S_i$ (10) from a dimension $d_{obs}$ measured on the projection image of said elementary object. In fact:

$$d_{real} = d_{obs}/\sin(\theta)$$

Figure 3:
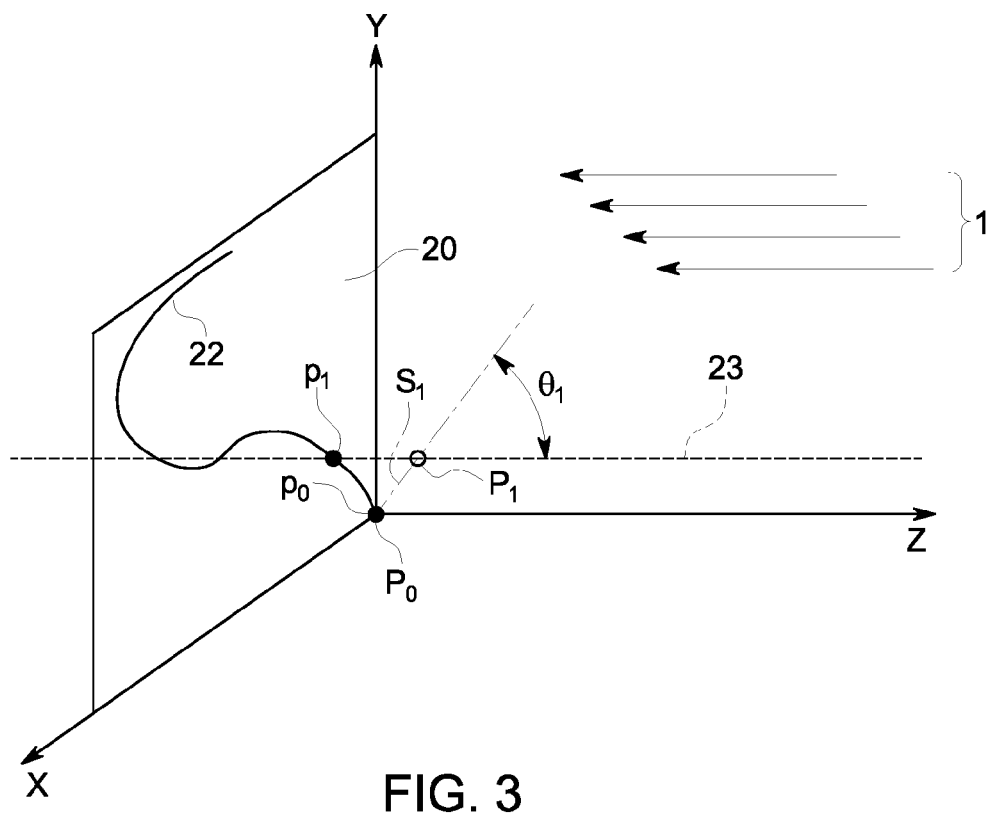
FIGS. 3 and 4 are three-dimensional schematic drawings of the process of three-dimensional reconstruction of a guide-wire, and FIG. 5 schematically illustrates a radiographic medical device for carrying out the process of the invention.
Figure 4:
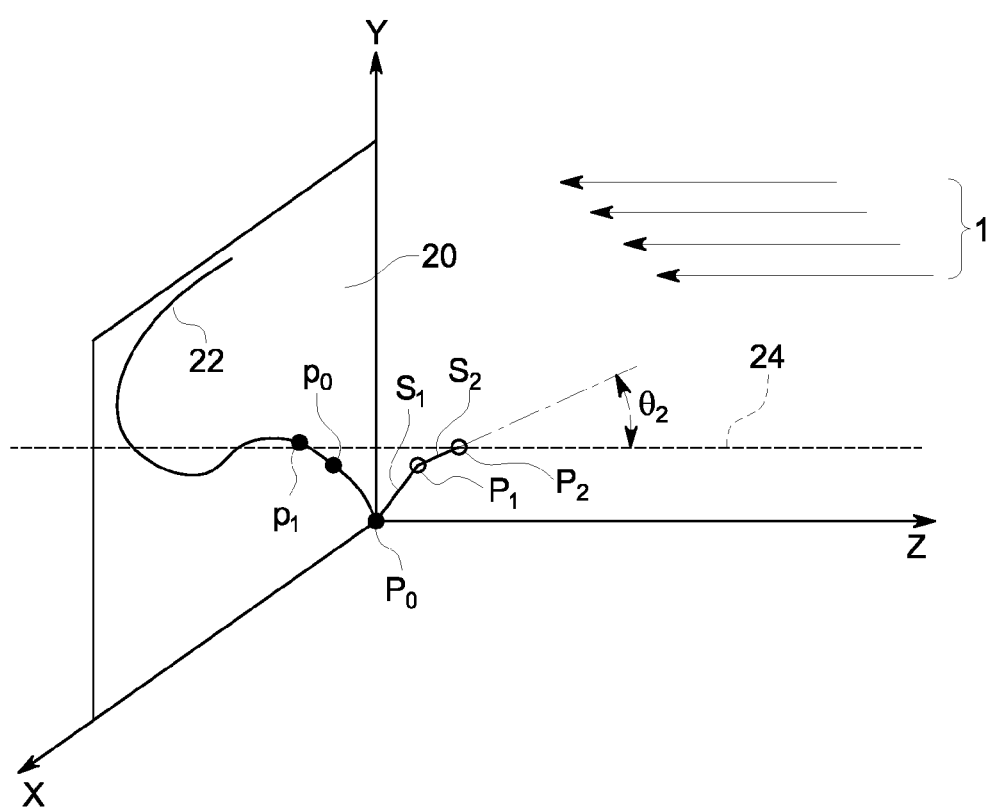

In reference to FIGS. 3 and 4, we will now describe a three-dimensional reconstruction process of an object exhibiting a curvilinear structure, such as a guide-wire or a catheter. A solution for reducing the ambiguity on θ will be described.

Knowing the form of the projection of the guide-wire by marking a median line (22) of said projection in the projection image, this form is cut out into a series of substantially rectilinear elementary slices. Each of these elementary slices corresponds to the projection on the recording means (20) of a median axis (11) of an elementary object $S_i$ (10) of the guide-wire to be reconstructed in three dimensions. In practice, here the size of each of the elementary slices can correspond to the size of a pixel of the projection image belonging to the median line (22), of the projection of the guide-wire. Of course, any other cutting out into slices is possible and can be employed.

To simplify the description, it is supposed that the projection image is obtained during so-called parallel projection: the X-rays (1) are parallel relative to one another and perpendicular to a plane (X,Y) containing the projection image. So, the X-rays (I) are according to an axis Z.

In parallel projection, coordinates at X and Y are invariable, and according to our hypothesis any translation according to the axis Z produces the same image. Accordingly, it is impossible to know the position of the relevant point according to the axis Z, that is, along a projection line. Similarly, in conical projection it is not possible to know the position of a point along the projection line.

Let $p_i(x_i,y_i)$ be a pixel of the projection of the guide-wire on the projection image and $P_i(X_i,Y_i,Z_i)$ be a point of the three-dimensional reconstruction of the guide-wire projecting onto the projection image at the pixel $p_i$. The reconstruction process commences at a point $p_0$ of the projection of the guide-wire which serves as starting pixel. Then let $p_0(x_0=0,y_0=0)$ be the origin of the plane (X,Y). Let $X_0=x_0=0$, $Y_0=y_0=0$ and $Z_0=0$ be the coordinates of the point $P_0$ of the end of the three-dimensional reconstruction of the guide-wire.

The process passes to the following pixel of the projection (22) of the guide-wire. In the present case, the following pixel is the pixel $p_i$ and corresponds to the projection of the point $P_i$ which the process will determine. The process then evaluates the absorbance of the elementary object $S_i=[P_0, P_1]$ from the slice $[p_0,p_1]$ which is its projection on the projection image. According to the image and the projection model, the point $P_1$ is on a straight line of the space which is parallel to the axis Z and which passes through the pixel $p_1$ of the image. Because of this, $X_1=x_1$ and $Y_1=y_1$. The process then determines both the value of $\sin(\theta_1)$ as well as the value of the length of the elementary object $S_1$, $d_{real}$, by using the processes described earlier if it proves necessary to later calculate a length of the reconstructed object. As we have seen, there are two possibilities for positioning $P_1$: the angle $\theta_1$ either has $\theta_1$ or $\pi-\theta_1$ for value. It is not possible to remove this ambiguity from the method for calculating the sinus of the angle $\theta_1$ previously described. The process will thus have from the outset two possible reconstructions for the guide-wire according to the value selected for $\theta_1$.

The process calculates the point $P_2$ in the same way, which projects on the following pixel $p_2$ of the projection (22) of the guide-wire. The process determines the absorbance of the elementary object $S_2=|P_1, P_2|$, the values of $\sin(\theta_2)$ and optionally $d_{real2}$. Now, the process will remove ambiguity on the value of $\theta_2$. For this, the process will consider that interventional instruments such as guide-wires or catheters are smooth or regular, that is, they cannot change direction suddenly. Mathematically, an angle between two elementary objects $S_{i-1}$ and $S_i$ must be minimal. So, the process selects the value of $\theta_2$ such that $\theta_2$ is the closest possible to $\theta_1$. Knowing the angle $\theta_2$, the process determines the coordinates of $P_2$.

The process then repeats determining each point $P_i$ of the three-dimensional reconstruction of the guide-wire projecting to the pixel pi of the projection (22) on the projection image: the process determines the absorbance of the elementary object $S_i=|P_{i-1}, P_i|$, the values of $\sin(\theta_i)$ and optionally of $d_{reali}$. The choice of the value of $\theta_i$ is such that $\theta_i$ and $\theta_{i-1}$ are the closest possible. From there, the process determines the coordinates of the point $P_i$.

An ambiguity can exist for the calculation of $\theta_i$ when the preceding elementary object $S_{i-1}$ is parallel to the projection image (thus the recording means). In this case it is not possible to choose between $\pi-\theta_i$ and $\theta_i$ via the previous method. For each of these particular ambiguities, there are two possibilities of three-dimensional reconstruction which exist. In practice, these ambiguities are few in number and there is finite and restricted number of three-dimensional reconstructions possible from a single view. If $n_{para}$ is the number of points where the object is parallel to the acquisition means, there are $2^{n_{para}+1}$ possible three-dimensional reconstructions. Because of this, the reconstruction process provides the user with a reduced number of three-dimensional reconstructions. The user selects the right reconstruction according to experience and knowledge of the situation. For example, if the aim of the reconstruction is to locate the guide-wire in a three-dimensional volume representing the vessels, some reconstructions can be eliminated based on the form of the vessels.

It is also possible to determine the total length of the guide-wire, and thus know the real length of the guide-wire introduced into the patient during surgical intervention. This can be done without performing three-dimensional reconstruction, by calculating only the $d_{real_i}$. For this, the process integrates the equation $d_{real}=d_{obs}/\sin(\theta)$ along the guide-wire (where s represents the curvilinear abscissa along the guide-wire in the projection image):

$$Length_{guide-wire} = \int_{projection} \frac{ds}{\sin(\theta(s))}$$

In practice, the process can add all the calculated values $d_{real_i}$:

$$Length_{guide-wire} = \sum_i d_{real_i}$$

This information more closely the interventional instrument, by the presence of an invariant.

Of course, it is possible to make numerous modifications to the invention without departing from the scope thereof.

What is claimed is:

1. A method for determining an orientation in space of a substantially cylindrical shaped elementary object using a radiography device comprising a source of X-rays and a detector disposed opposite the source, wherein the radiography device is arranged to record a projection image of the elementary object when the elementary object is located between the source and the detector, the method comprising:
    determining with a processing system a quantity A of X-rays absorbed by the elementary object on the projection image; and
    evaluating with the processing system the sine of an angle $\theta$ as a function of the quantity A of absorbed X-rays, wherein the angle $\theta$ is between a longitudinal axis of the elementary object and a plane of the projection image.

2. The method of claim 1, wherein evaluating with the processing system the sine of an angle $\theta$ as a function of the quantity A of absorbed X-rays is determined in accordance with the following relationship:

$$\sin(\theta) = -2\mu \frac{r}{\ln(A)},$$

where r is a radius of a cross-section of the elementary object and $\mu$ is radiological linear absorbance of the elementary object.

3. The method of claim 1, wherein evaluating with the processing system the sine of an angle $\theta$ as a function of the quantity A of absorbed X-rays is determined in accordance with the following relationship:

$$\sin(\theta) = \frac{K}{\ln(A)},$$

where K is constant absorbance dependent on the elementary object.

4. The method of claim 2, further comprising:
    determining with the processing system a projected dimension $d_{obs}$ on the projection image; and
    determining with the processing system a dimension $d_{real}$ from the orientation in space of the elementary object and the projected dimension $d_{obs}$;
    wherein the dimension $d_{real}$ in space of the substantially cylindrical shaped elementary object, is determined in accordance with the following relationship:

$$d_{real}=d_{obs}/\sin(\theta),$$

where $d_{real}$ is the dimension and $d_{obs}$ is the projected dimension.

5. The method of claim 3, further comprising:
    determining with the processing system a projected dimension $d_{obs}$ on the projection image; and
    determining with the processing system a dimension $d_{real}$ from the orientation in space of the elementary object and the projected dimension $d_{obs}$;
    wherein the dimension $d_{real}$ in space of the substantially cylindrical shaped elementary object, is determined in accordance with the following relationship:

$$d_{real}=d_{obs}/\sin(\theta),$$

where $d_{real}$ is the dimension and $d_{obs}$ is the projected dimension.

6. The method of claim 1, wherein for each elementary object $S_i=[P_{i-1}, P_i]$ of the elementary object, the method further comprises:
    determining with the processing system relative coordinates in space of one end $(P_{i-1}, P_i)$ of said elementary object $S_i$ relative to the other end $(P_{i-1}, P_i)$ of said elementary object $S_i$.

7. The method of claim 6, further comprising:
    determining with the processing system a length of the elementary object by a method comprising:
        determining with the processing system a projected dimension $d_{obs}$ on the projection image; and
        determining with the processing system a dimension $d_{real}$ from the orientation in space of the elementary object and the projected dimension $d_{obs}$;
        wherein the dimension $d_{real}$ in space of the substantially cylindrical shaped elementary object, is determined in accordance with the following relationship:

$$d_{real}=d_{obs}/\sin(\theta),$$

where $d_{real}$ is the dimension and $d_{obs}$ is the projected dimension.

8. The method of claim 6, wherein a value of the angle $\theta_i$ is selected from the values $\theta_i$ and $\pi-\theta_i$ in such a way that $\theta_i$ is the closest possible to $\theta_{i-1}$.

9. The method of claim 7, wherein once all of the elementary objects $S_i=[P_{i-1}, P_i]$ of the elementary object are treated, the method further comprises:
  determining with the processing system the total length of a reconstructed object.

10. The method of claim 9, wherein the total length of the reconstructed object is the sum of the lengths of the elementary objects $S_i$.

* * * * *

UNITED STATES PATENT AND TRADEMARK OFFICE
CERTIFICATE OF CORRECTION

PATENT NO. : 8,588,500 B2  
APPLICATION NO. : 12/873797  
DATED : November 19, 2013  
INVENTOR(S) : Bismuth et al.

Page 1 of 1

It is certified that error appears in the above-identified patent and that said Letters Patent is hereby corrected as shown below:

On the Title Page, Item (75), under "Inventors", in Column 1, Line 1, delete "Sebastian" and insert -- Sebastien --, therefor.

On the Title Page, Item (56), under "OTHER PUBLICATIONS", in Column 2, Line 12, delete "Israel," and insert -- Israel, Received July 21, 1986; --, therefor.

In the Specifications

In Column 3, Line 13, delete "aspect:" and insert -- aspect; --, therefor.

In Column 5, Line 2, delete "FIG. 1bis." and insert -- FIG. 1b. --, therefor.

In Column 5, Line 29, delete "absorbance p" and insert -- absorbance $\mu$ --, therefor.

Figure 2A:
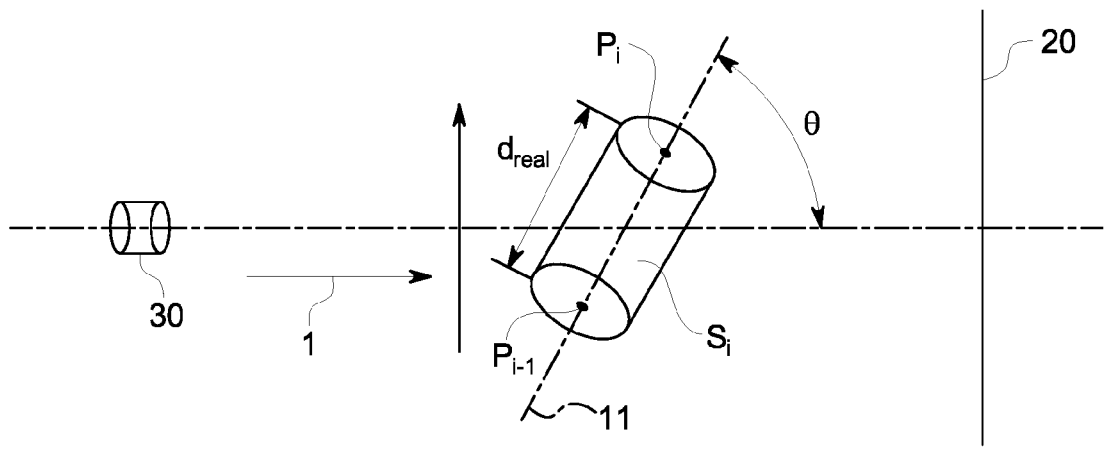
FIGS. 2A and 2B are schematic drawings of the process for evaluation of the orientation, on the one hand, and of a dimension of an elementary object, on the other hand.
Figure 2B:
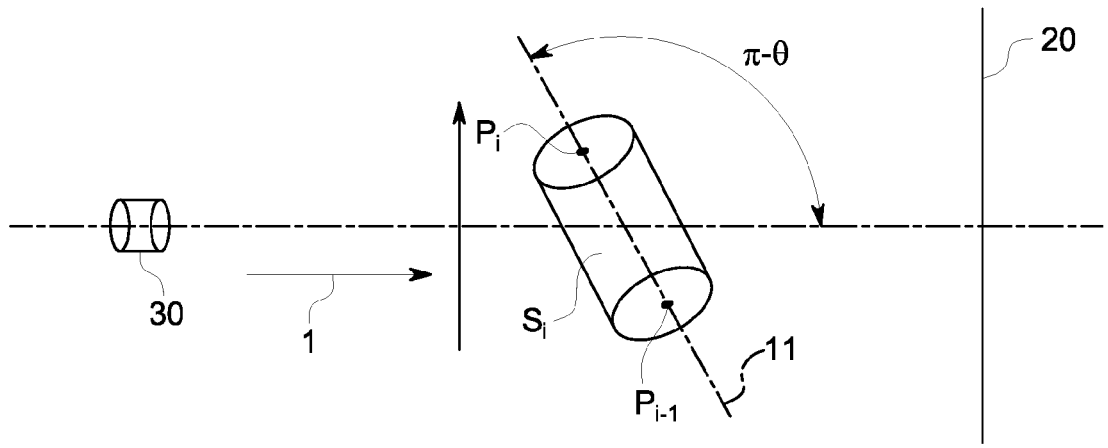

In Column 5, Line 47, delete "FIG. 2bis)." and insert -- FIG. 2b). --, therefor.

In Column 6, Line 8, delete "X-rays (I)" and insert -- X-rays (1) --, therefor.

Signed and Sealed this  
Eleventh Day of March, 2014

Michelle K. Lee  
*Deputy Director of the United States Patent and Trademark Office*